MILBURN & BROWNING.
Grain Drier.
No. 105,709.                                          Patented July 26, 1870.
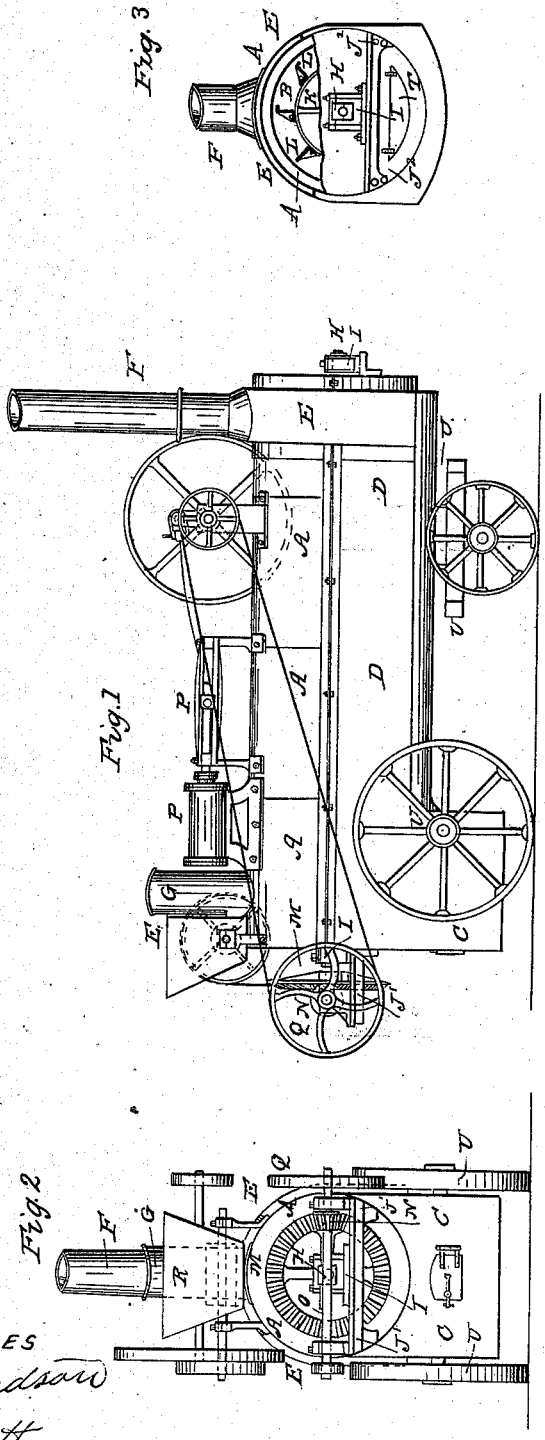

United States Patent Office.

ROBERT MILBURN AND THOMAS BROWNING, OF NO. 76 CHURCH LANE, WHITECHAPEL, GREAT BRITAIN.

Letters Patent No. 105,709, dated July 26, 1870.

GRAIN-DRIER.

The Schedule referred to in these Letters Patent and making part of the same.

*To all to whom it may concern:*

Be it known that we, ROBERT MILBURN, gentleman, and THOMAS BROWNING, engineer, both of No. 76 Church Lane, Whitechapel, subjects of the Queen of Great Britain, have invented or discovered new and useful "Improvements in Drying-Machines, suitable for drying ears of corn, grain, seeds, malt, spent hops, brewers' and distillers' grains, and other materials;" and we, the said ROBERT MILBURN and THOMAS BROWNING, do hereby declare the nature of the said invention, and in what manner the same is to be performed, to be particularly described and ascertained in and by the following statement thereof; that is to say—

This invention has for its object improvements in drying-machines, and is applicable to machines in which the materials to be dried are carried through a jacketed cylinder by the aid of lifters on an axis revolving within it.

We convert the jacket-space into a steam-boiler by combining therewith a fire-box, of the whole or part of the width of the machine, with a flue leading from it along the under side of the machine to its opposite end, where it terminates in a chimney.

The hopper for feeding the material to be dried into the cylindrical drying-chamber of the machine, and the flue for the escape of vapor therefrom, are, by preference, both placed at the fire-box end of the apparatus.

The space between the outer shell or jacket and the drying-chamber is made rather larger than heretofore, in order that it may form a steam-boiler, the outer shell being fitted with a safety-valve, pressure-gauge, and water-gauge.

A horizontal or other steam-engine is fixed to the machine, for imparting motion to the revolving axis which carries the lifters of the drying-machine; or, when the drying-machine is not in use, it may be employed for driving other machinery, in a similar manner to an ordinary agricultural engine.

The exhaust steam from the engine may be led partly into the chimney, to create a draught therein, and partly, also, into the vapor-flue from the drying-chamber, to carry off the moisture from the wet material as fast as it is produced.

The machine may be mounted on wheels, like an ordinary agricultural engine, so that it may be moved from place to place.

A pulley on the crank-shaft of the engine transmits motion, by a band, to a counter-shaft carried on a bracket at the fire-box end of the boiler, and a toothed wheel on this shaft gives motion to a toothed wheel on the end of the axis, which passes longitudinally through the center of the cylindrical drying-chamber, and which carries the lifters or shelves by which the materials to be dried are raised from the bottom of the cylinder, and allowed again to fall onto it in showers.

The shaft or counter-shaft, by a pulley or wheel upon it, also gives motion, by a band or otherwise, to another pulley or wheel on the axis of the screw or roll by which the materials to be dried are fed from a hopper into the drying-chamber.

And in order that our said invention may be most fully understood and readily carried into effect, we will proceed to describe the drawing hereunto annexed.

Description of the Drawing.

Figure 1 is a side view,
Figure 2, a front view, and
Figure 3, a back view, partly in section, of a drying-machine constructed according to our invention.

A is a casing of boiler-plate.

B is a cylinder placed inside of A, and extending to the same length. They are joined together at the ends, so as to leave a steam-tight space between them.

C is a fire-box, and

D, a flue, which passes into another flue, E, going around the end of the cylinder A, and terminating in the chimney F.

G is the vapor-flue leading through both shells into the interior of the machine.

H is the main center-shaft, working in the plummer-blocks I I, fixed to the brackets $J^1$ $J^2$.

This shaft carries two or more wheels, K, on which are fastened shelves or lifters, L, extending the whole length of the machine.

M is a toothed wheel fixed to the center-shaft, and worked by a pinion, N, on the counter-shaft O, which runs in plummer-blocks on the bracket $J^1$.

P is a steam-engine of the ordinary construction, fixed on the casing A, and, by a rigger and driving-band, giving motion to the rigger, Q, on the counter-shaft O.

The engine has steam connection with the space between the casing A and cylinder B, and the exhaust steam from it is led by suitable pipes (not shown) partly into the chimney F, and partly into G, in which latter flue it creates a draught for the purpose of drawing off the vapor arising from the material in the process of drying.

R is a hopper having a roll or screw to feed the substances into the machine through the flue G. This is worked by a band from a rigger, S, on the counter-shaft O.

The end of the cylinders over the fire-box is perfectly closed, but at the opposite end only partially, there being a door, T, through which the dried material escapes.

The pipe from the pump to the feed-water cistern may be passed through the flue E or D, in order that the water may enter the boilers already heated.

U U U are the carriage and wheels upon which the machine is placed; or, in some cases, the machine may be made without wheels.

A safety-valve, pressure-gauge, and water-gauge are fixed on in the same manner as in ordinary portable engines.

Water is filled into the boiler or space between the cylinders through an opening made for the purpose, and the water-line must be above the flue D.

By taking off the driving-band from the engine to the counter-shaft, the machine becomes an ordinary engine; or, by means of an additional rigger or the fly-wheel on the crank-shaft, other machines may be worked while the drying process is in operation.

By a slight modification, air may be used in place of steam or water as the heating medium.

We claim—

Constructing a drying-machine as above described, to be capable of being also used as a portable engine for obtaining power.

ROBT. MILBURN.
THOS. BROWNING.

Witnesses:
THOMAS LAKE, } Both of No. 17 Gracechurch
THOS. BROWN. } street, London.